United States Patent [19]

Slaugh

[11] Patent Number: 4,559,321

[45] Date of Patent: Dec. 17, 1985

[54] PROCESS FOR PRODUCING WIDE PORE CATALYST SUPPORTS

[75] Inventor: Lynn H. Slaugh, Cypress, Tex.

[73] Assignee: Shell Oil Company, Houston, Tex.

[21] Appl. No.: 695,340

[22] Filed: Jan. 28, 1985

[51] Int. Cl.$^4$ .................. B01J 21/04; B01J 21/08; B01J 21/12
[52] U.S. Cl. ................. 502/263; 502/232; 502/355
[58] Field of Search .............. 502/232, 233, 263, 355, 502/439, 527

[56] References Cited

U.S. PATENT DOCUMENTS

| | | |
|---|---|---|
| 2,211,208 | 8/1940 | Ipatieff et al. ............... 502/527 X |
| 3,417,028 | 12/1968 | Montgomery et al. . |
| 3,997,476 | 12/1976 | Cull ............................. 502/439 |
| 4,082,697 | 4/1978 | Tamm ......................... 502/439 X |
| 4,102,821 | 7/1978 | Pessimisis .................... 502/439 |
| 4,356,113 | 10/1982 | Lim et al. . |
| 4,448,833 | 5/1984 | Yamaguchi et al. ......... 502/527 X |

FOREIGN PATENT DOCUMENTS 918064 2/1963 United Kingdom ............ 502/527

Primary Examiner—Carl F. Dees

[57] ABSTRACT

Humic acid or the sodium salt thereof is used to modify the pore distributions in silica and/or alumina compositions.

7 Claims, No Drawings

PROCESS FOR PRODUCING WIDE PORE CATALYST SUPPORTS

FIELD OF THE INVENTION

This invention relates to a process for preparing porous alumina- and/or silica-containing porous supports having a high proportion of their pores in pore sizes greater than 350 Å.

BACKGROUND OF THE INVENTION

In certain petrochemical reactions the use of catalysts containing metal impregnated pores having diameters less than about 100 Å can present many problems. Diffusional limitations can occur when reactions take place in very small pores. Plugging of fine pores can occur by deposition of polymers, tars or other coking material. Many petrochemical feedstocks contain various metal impurities such as nickel, vanadium or ion which can deposit out and poison small pores sized catalyst materials.

U.S. Pat. No. 4,356,113, issued Oct. 26, 1982, teaches a method for producing catalyst substrates containing pores within a certain calibrated range (100–1550 Å) by incorporating carbon black particles into an alumina gel and subsequently burning them out during calcination.

U.S. Pat. No. 3,417,028, issued Dec. 17, 1968, discloses a preparation of catalyst supports having increased pore volume in larger pore sizes by incorporating selected polymers into hydrous gels of alumina, silica or alumina-silica prior to calcination.

SUMMARY OF THE INVENTION

The present invention relates to pores in inorganic oxide materials useful as catalyst supports or as catalysts and which comprise porous alumina- and/or silica and contain at least 10% of their pore volume in pores having diameters greater than 350 Å. These inorganic oxide materials are prepared by a process which comprises (a) forming a mixture of a hydrous gel of aluminum oxide, silicon oxide, or aluminum-silicon oxide with from about 1 to about 10% by weight, basis the anhydrous, oxide of humic acid or an alkali metal salt of humic acid, (b) drying the mixture of step (a) at a temperature ranging from about 25° C. to about 250° C. and (c) calcining the product of step (b) in an oxygen containing atmosphere at a temperature ranging from about 500° to about 700° C. The use of humic acid and its salts provides for the production of a catalyst or carrier having pores with a wider diameter than that normally provided by a traditional techniques. These "wide-pore" materials have advantages over traditional materials when used as catalysts and petrochemical reactions. High crush strengths are also obtained.

DESCRIPTION OF THE PREFERRED EMBODIMENTS

In the process of the instant invention, aluminum oxide, silicon oxide, and aluminum-silicon oxide hydrogels are utilized in combination with humic acid or an alkali metal salt thereof to produce a catalyst or catalyst carrier having at least 10% of its pore volume in pores of greater than 350 Å.

The hydrous oxide alumina and/or silica gels utilized in the instant process are prepared by well known processes. For example, alumina and silica gels are prepared commercially by acidifying soluble alkali metal aluminate or silicate solutions. Alumina gels can also be made by precipitating suitable soluble aluminum salts such as aluminum nitrate or aluminum sulfate with a suitable precipitating agent such as ammonium hydroxide, sodium carbonate, etc. Mixtures of silica-alumina gels which are of considerable importance for the catalytic cracking of petroleum materials are often prepared by blending weakly acid or alkaline silica gel with a solution of aluminum sulfate, followed by appropriate exchange and washing cycles to lower the sodium content of the gel. Other techniques are well known to those skilled in the art and can be utilized as well.

Humic acids are defined as allomelanins found in soils, coal and peat, resulting from the decomposition of organic matter, particularly dead plants (the Merck Index, 10th Ed.). They consist of a mixture of complex macromolecules or polymers containing aromatic and heterocylic structure, carboxyl groups, and nitrogen. Humic acid can be prepared from lignite and coal, see for example J. Sci. Ind. Res. (India) 12 B, 443 (1953). Humic acid, as utilized in the instant process, is present in the acid form or as the alkali metal salt. Humic acid in the sodium salt form can be obtained commercially from Aldrich Chemical Company.

The first step in the instant process is to form a mixture of a hydrous gel of aluminum oxide, silicon oxide, or aluminum-silicon oxide with humic acid or an alkali metal salt of humic acid. There are two basic techniques for producing this mixture. The first technique comprises providing a hydrous gel of alumina, silica or alumina-silica by traditional means and adding thereto humic acid or an alkali metal salt thereof and intimately mixing the two components. Mixing is accomplished by traditional means such as high speed shearing, impeller mixing, etc. The second general technique comprises forming an aqueous solution of humic acid or alkali metal salt thereof; forming an aqueous solution of a precipitable salt of silica and/or alumina; mixing the two solutions; and bringing about the precipitation of a hydrous gel of alumina and/or silica and said humic acid or alkali metal salt thereof. Alternatively, the humic acid or salt may be added directly to the aqueous solution of precipitable salt prior to precipitation.

After the mixture of oxide gel and humic acid or humate is prepared, it is then dried by conventional means. Drying may be carried out by forced draft drying, vacuum drying, air drying or similar means. Drying temperatures are not critical and depend upon the particular means utilized for drying. Typically drying temperatures will range from about 25° C. to about 250° C.

After drying, the material is calcined to convert the gel to the oxide and then heated in a oxygen-containing atmosphere, preferable air, at a sufficient temperature whereby the humic acid or humate material is burned out. Calcination may be in a neutral, reducing or oxidizing environment. Calcining temperatures will typically range from about 300° to about 700° C. Burn-out temperatures will depend on the concentration of oxygen in the burn-out atmosphere as well as the burn-out time involved. Typically burn-out temperatures will range from about 300° to about 700° C. Drying, calcining and burn-out may be combined in one or two steps. Most frequently the calcining and burn-out steps are combined using an oxygen-containing atmosphere.

Certain other processing steps may be incorporated into the above described procedure without deviating from the scope and intent of this invention. For example, prior to the complete drying of the product, it may be formed into suitable pellets or rings and then dried more completely, followed by calcination and burn-out. Alternatively, the dried product may be mulled; binders and lubricants added to the mulled product; and the resultant material extruded, dried, and calcined in air. The calcined product may be utilized as such as a catalyst, or it may be impregnated with certain catalytically active species.

The porous inorganic oxides of the present invention will be found to have a certain proportion of their pores in the "wide-pore" range. Typically, they will have at least 10%, and preferably at least 15% of their pore volume in pores having pore diameters of greater than 350 Å.

The porous inorganic oxides of the instant invention are particularly useful in hydrocarbon or petrochemical reactions, particularly when catalytically active materials such as Group VIII metals are utilized as catalytically active metals supported on the inorganic oxide materials. Such Group VIII catalyzed materials can be suitably applied to hydrocarbon conversion processes such as catalytic cracking, hydrocracking, hydrotreating, reforming, isomerization, hydrogenation, dehydrogenation, oligomerization, alkylation, dealkylation, demetallization and the like.

Because the instant materials can be prepared with pores of relatively large size, when used as catalysts, they are particularly useful for the conversion of hydrocarbon feedstocks and aromatic chemicals. When so utilized, the instant materials allow for rapid diffusion in of reactants and rapid diffusion out of products, provide for a much longer life than smaller pore materials which readily plug up with coke, tar or polymers.

The instant porous inorganic oxide materials when utilized to support molybdenum, vanadium and cobalt as catalytically active metals, are very suitable for demetallization reactions involving crude feedstocks. The larger pores of the instant materials are not quickly plugged up by the depositing metals, and hence provide very long life. In a typical demetallization reaction a crude feedstock is contacted with the instant catalyst at a temperature ranging from about 350° to about 450° C. and at a pressure ranging from about 500 to 5000 psi. Rare earth metals such as cerium, lanthanium, samarium, neodymium and the like are useful as catalysts when supported on the instant compositions for use in hydrocarbon conversion processes.

The process for preparing the porous inorganic oxide materials of the instant invention will be further described below by the following illustrative embodiments which are provided for illustration and which are not to be construed as limiting the invention.

EXAMPLE I

Aluminum Oxide Preparation

A. Preparation of Alumina Gel

440 Grams of sodium aluminate were added to a stirred solution of 11 g of sodium hydroxide in 1100 milliters of water which was then heated to 80° C. A one molar solution of sulphuric acid was heated to 80° C. Both solutions were pumped into a vigorously stirred beaker containing 750 milliters of water at 80° C. A pH of 8 was maintained over a 20 minute addition period for the sodium aluminate solution. The aging step for the gel was done in 15 minutes with the pH adjusted to 10 by the additional of two molar sodium hydroxide solution. Filteration and washing of the gel was done in a 19 centimeter diameter Buchner funnel. The initial filteration was allowed to draw nearly all of the supernatent water layer down to the gel. In the subsequent washing with deionized water care was taken to avoid cracks in the gel by maintaining a water layer above the filter cake. 12 Liters of water were drawn through the filter cake over a 4 hour period.

The alumina gel was divided into equal portions. To one portion one milliter of acetic acid was mixed in for peptization. The gel was extruded (weight about 250 g). The extrudate was dried at 100° C. for overnight. The dried extrudate was then placed in a Vycor ® tube with a 200 milliter per minute air flow and heated to 500° C. over a 4 hour period. The surface area (B.E.T.) was determined by nitrogen adsorption, the pore volume was determined by mercury intrusion at 3000 psi and pore distribution was determined by mercury intrusion to 55,000 psi. Results for this comparative example is shown in Table 1 as example 1A.

B. Sodium Humate Modified Alumina

To the other half of the alumina gel prepared above was added one milliter of acetic acid and 2 g of the sodium salt of humic acid (total weight about 250 g-sodium humate obtained from Aldrich Chemical Company). After mixing, the same procedures as indicated above were followed for extrusion, drying and calcination. The properties for this humic acid modified alumina are shown in the table under example 1B.

C. Humic Acid Modified Alumina

In this example the sodium salt of humic acid was acidified and the resultant material was utilized to prepare a composition of the instant invention. 30 Grams of the sodium salt of humic acid were mixed with 150 milliters of one molar sulphuric acid, filtered and washed with water. The original salt contained 8.5% sodium and after acid treatment it contained 0.18% sodium. 5 Grams of the above acidified humic acid, one milliter of acetic acid and 100 g dry wt basis alumina of alumina gel were mixed (total weight approximately 250 g), extruded, dried at 100° C. and finally calcined at 600° C. The properties for this material are given in the table below under example 1C.

EXAMPLE 2

Silicon Oxide Preparation

A. Preparation of Silica Gel

A solution was prepared by diluting 362 g of sodium silicate solution (40° Be) with 1400 milliters of water. Another solution was prepared utilizing 333 milliters of 6.0 normal nitric acid plus 667 milliters of water. The two solutions with simultaneously pumped into a stirred vessel containing 400 milliters of water at ambient temperature while maintaining the pH at 7. The time of addition for the two solutions was 20 minutes. The gel was allowed to stand overnight for aging. The gel was then filtered and washed over a 5 hour time period with 12 liters of water, keeping the water layer above the filter cake at all times. The gel was divided, and an unmodified portion was dried at 120° C. for two hours and then calcined to 500° C. for four hours. The properties of this unmodified material are shown in the table below under example 2A.

B. Sodium Humate Modified Silica

One-half of the silica material prepared above was mixed with 5 g of the sodium salt of humic acid. The resultant material was dried at 120° C. for two hours and then calcined to 500° C. for four hours. The properties of this sodium humate modified silica are shown in the table below under example 2B.

TABLE I

| Example | Surface Area m²g | Pore Volume cc/g | Pore Volume Distribution in Å | | | | | | Crush Strength psi |
|---|---|---|---|---|---|---|---|---|---|
| | | | <50 | 50-70 | 70-100 | 100-150 | 150-350 | >350 | |
| 1A Unmodified Alumina | 379 | 0.68 | 30.8 | 18.3 | 25.9 | 10.3 | 4.5 | 6.7 | 31 |
| 1B Sodium Humate Modified Alumina | 347 | 0.81 | 30.8 | 17.7 | 19.6 | 7.8 | 4.9 | 19.2 | 23 |
| 1C Humic Acid Modified Alumina | 377 | 0.79 | 32.2 | 30.7 | 10.6 | 0 | 5.0 | 21.0 | 21 |
| 2A Unmodified Silica | 485 | 0.55 | 74.3 | 10.0 | 5.4 | 3.5 | 3.8 | 3.1 | — |
| 2B Sodium Humate Modified Silica | 391 | 1.14 | 15.4 | 42.2 | 19.1 | 1.7 | 5.8 | 15.7 | — |

I claim:

1. A process for the preparation of porous inorganic oxides having at least 10% of their pore volume in pores of greater than 350 Å which process comprises:
   (a) forming a mixture of a hydrous gel of aluminum oxide, silicon oxide or aluminum-silicon oxide with from about 1 to about 10 percent by weight basis anhydrous oxide of humic acid or an alkali metal salt of humic acid,
   (b) drying the mixture of step (a),
   (c) calcining the product of step (b) at a temperature sufficient to convert the gel to an oxide,
   (d) heating the product of step (c) in an oxygen-containing atmosphere at a temperature sufficient to burn-out the humic acid.

2. The process of claim 1 wherein the drying step (b) is carried out at a temperature ranging from about 25° to about 250° C.

3. The process of claim 1 wherein the calcining step (c) is carried out at a temperature ranging from about 300° to about 700° C.

4. The process of claim 1 wherein the heating step (d) is carried out at a temperature ranging from about 300° to about 700° C.

5. The process of claim 1 wherein the drying and calcining steps are combined in one step at a temperature ranging up to about 700° C.

6. The process of claim 1 wherein the calcining and heating steps are combined in one step at a temperature ranging up to about 700° C.

7. The process of claim 1, 2, 3, 4, 5 or 6 wherein the drying, calcining and heating steps are carried out in one step in air.

* * * * *